United States Patent [19]
Veitl

[11] 3,981,426
[45] Sept. 21, 1976

[54] CORROSION-RESISTANT STRUCTURAL SHAPE CLAD BY ROLLING AND WELDING AND COMPRISING A BASE MATERIAL AND A CLADDING MATERIAL AND METHOD OF PRODUCING SUCH A STRUCTURAL SHAPE

[75] Inventor: Giswalt Veitl, Linz, Austria

[73] Assignee: Vereinigte Osterreichische Eisen- und Stahlwerke-Alpine Montan Aktiengesellschaft, Linz, Austria

[22] Filed: Dec. 4, 1974

[21] Appl. No.: 529,296

[30] Foreign Application Priority Data
Dec. 17, 1973 Austria .............................. 10532/73

[52] U.S. Cl. ................................. 228/118; 228/170
[51] Int. Cl.² .......................................... B23K 1/20
[58] Field of Search ........... 228/118, 170, 171, 189, 228/172, 174

[56] References Cited
UNITED STATES PATENTS
2,416,400   2/1947   Mehl .................................. 228/118
3,116,549   1/1964   Born et al. ...................... 228/118 X FOREIGN PATENTS OR APPLICATIONS
407,943   3/1934   United Kingdom ................. 228/118

Primary Examiner—Al Lawrence Smith
Assistant Examiner—Margaret Joyce
Attorney, Agent, or Firm—Brumbaugh, Graves, Donohue & Raymond

[57] ABSTRACT

A corrosion-resistant structural shape, clad by rolling and welding, has a base material consisting of an austenitic manganese steel and a cladding material containing alloy elements tending to phase precipitations. In a method of producing a structural shape of the above described type from a cladding pile composed sandwich-like of two base material plates and two smaller cladding sheet bars, a separating layer is inserted between the cladding sheet bars and the gap surrounding the cladding sheet bars is closed all around by means of weld strips fused with the base material plates. First the edges of the base material plates are ground beveled and then the ground-off material is replaced by building-up welding layers of carbon steel. The pile is composed and the weld strips are inserted and connected with the claddings by means of root seams along the circumference of the pile. Finally by applying further welding layers between the building-up welding layers and the weld strips, the gap is closed tight and the pile is completed.

5 Claims, 1 Drawing Figure

U.S. Patent  Sept. 21, 1976  3,981,426
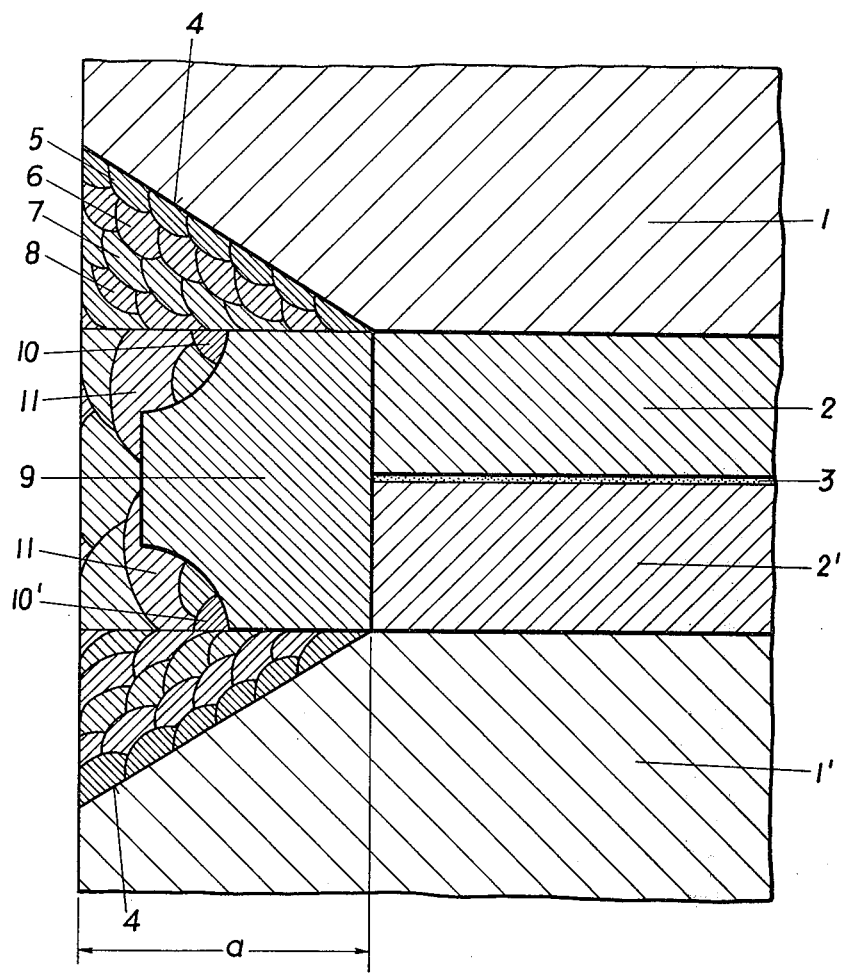

CORROSION-RESISTANT STRUCTURAL SHAPE CLAD BY ROLLING AND WELDING AND COMPRISING A BASE MATERIAL AND A CLADDING MATERIAL AND METHOD OF PRODUCING SUCH A STRUCTURAL SHAPE

BACKGROUND OF THE INVENTION

The invention relates to a corrosion-resistant structural shape, which is clad by rolling and welding, and which comprises a base material and a cladding material. In particular the invention relates to clad plates, as well as a method of producing such a structural shape.

For producing corrosion-resistant structural shapes, in particular plates, a method of cladding is used; wherein a base material that may consist of a carbon steel or of an alloyed steel is connected with a corrosion-resistant cladding material. Suitably the connection procedure is effected by rolling a cladding pile consisting of the base material and of the cladding material. Corrosion-resistant alloys are known in various compositions. They have a high content of nickel, molybdenum, chromium, and the like, and are rather expensive materials. In alloys of this kind, however, a precipitation of undesired phase occurs, when the content of alloy elements tending to precipitations amounts to the following percentages: carbon 0.001 to 0.2% by weight; molybdenum 2.5 to 17% by weight; chromium 12 to 25% by weight; nickel 9 to 70% by weight, and silicon 0.01 to 4% by weight. In the art these precipitations are called sigma-phase, chi-phase and lave-phase. A particularly critical limit is considered to exist at a content of nickel and chromium together amounting to 30%.

So as to avoid precipitations in the above mentioned, corrosion-resistant alloys, it is necessary to subject these alloys to a solution heat treatment. The solution heat treatment is normally carried out in a temperature range between from 1175° to 1230°C during several hours. Subsequently the material that has been subjected to a solution heat treatment is quenched in water. When such a solution heat treatment is necessary in the case of a clad structural shape, the entire structural shape, for instance the rolled cladding pile, has to be subjected to the heat treatment. From this it follows that only a base material that can withstand this heat treatment can be used. An unalloyed carbon steel cannot be used because it would be overheated by the high temperatures occurring in the solution heat treatment and hence its mechanical properties would be impaired considerably. As is known, overheating leads to an increase in the grain size, which causes detrimental effects. This is why hitherto in producing corrosion-resistant structural shapes clad by rolling and welding in which the cladding material consisted of a corrosion-resistant alloy of the above mentioned composition, it was necessary to use as base materials only those capable of withstanding the extreme conditions of solution heat treatment. Such materials are austenitic chromium-nickel steels which are, however, very expensive and whose valuable specific properties cannot be utilized sufficiently in the more or less subordinate use as a base material.

SUMMARY OF THE INVENTION

The invention aims at avoiding the above mentioned disadvantages and difficulties by providing a highly corrosion-resistant structural shape, which is clad by rolling and welding, and which comprises a base material and a cladding material, wherein the base material is considerably cheaper than the expensive chromium-nickel steels and is capable of withstanding, without any detrimental effect, the conditions of solution heat treatment which are required by the use of the high-alloy cladding material. Moreover, the base material should be weldable.

According to the invention this object is achieved in that the base material is an austenitic manganese steel having the following composition: C 0.3 to 0.9% by weight; Si 0.05 to 0.1% by weight; Mn 13 to 19% by weight; NI 0 to 2% by weight; Cr 0.5 to 1.0% by weight; Cu 0 to 0.20% by weight; Co 0 to 2% by weight; P 0 to 0.007% by weight; S 0 to 0.002% by weight; remaining part iron.

The essence of the invention therefore consists in that two austenitic materials are connected with each other under cladding by rolling and the heat treatment necessary for achieving the corrosion resistance of the cladding material optimumly brings out the properties of the base material without impairing the weldability, the mechanical properties and the austenitic structure of the base material. The following table contains preferred examples for the chemical composition of the base material.

Table

| C | Si | Mn | Ni | Cr | Cu | Co | P | S | Fe |
|---|---|---|---|---|---|---|---|---|---|
| 0.7 to 0.8 | 0.05 to 0.1 | 17 to 17.5 | 0 to 0.5 | 0.88 to 1.0 | 0 to 0.05 | 0 to 0.5 | 0 0.007 | 0 to 0.018 | remaining part |
| 0.6 to 0.7 | 0.05 to 0.1 | 17.5 to 18.5 | 0.5 to 1.5 | 0.75 to 0.88 | 0 to 0.15 | 0.5 to 1.5 | 0 0.007 | 0 to 0.018 | remaining part |
| 0.4 to 0.6 | 0.05 to 0.1 | 18.5 to 19 | 1.5 to 2 | 0.5 to 0.75 | 0 to 0.20 | 1.5 to 2 | 0 0.007 | 0 to 0.018 | remaining part |

Furthermore the invention comprises a method of producing a structural shape of the above described type, which method starts from the step of composing a cladding pile in the form of a sandwich from two base material plates and two cladding sheet bars of smaller dimensions than the base material plates. The base material plates are arranged on the outer side and the sheet bars on the inner side. Between the sheet bars a separating layer preventing the sheet bars from welding together is provided and the gap surrounding the cladding sheet bars between the edges of the base material plates is closed all around by the weld strips fused with the base material plates. Prior to rolling the pile has to be evacuated as described in Austrian Pat. No. 245,895.

The method of the invention aims at facilitating by means of auxiliary measures the welding of the weld strips into the gap of the cladding pile and at facilitating the connection with the manganese steel. In particular, the invention seeks to make the welding procedure as easy as it would be when using carbon steel. These measures consist in that first the edges of the base material plates are ground beveled, preferably at an angle between 15° to 30°. The ground-off material is replaced by a number of built-up welding layers consisting of carbon steel. Then the pile is composed and the weld strips are inserted; the weld strips are along the circumference of the pile connected by root seams with the built-up welding layers or claddings. Finally by applying additional welding layers between the built-up welding layers and the weld strips the gap is closed tight and the pile is completed.

Suitably cooling with water is effected during the building up of the claddings.

Preferably for the first layer of the built-up welding layers high-alloy austenitic electrodes are used and for the following layers carbon steel as additional material may be used.

BRIEF DESCRIPTION OF THE DRAWING

In order that the method of the invention may be more fully understood it will now be described in more detail by way of example with reference to the accompanying drawing which shows a section through a cladding pile in the edge zone.

DESCRIPTION OF EXEMPLARY EMBODIMENTS

Two base material plates having the dimensions 2,500 mm × 1,500 mm × 100 mm and having the following composition

| C | Mn | Ni | Co | Cu | Cr | Si | S | P |
|---|---|---|---|---|---|---|---|---|
| 0.6% | 18% | 1% | 0.5% | 0.15% | 0.75% | 0.1% | 0.015% | 0.006% |

Fe
remaining part
are denoted with 1 and 1' in the drawing. In between the cladding, sheet bars which are denoted with 2 and 2' are inserted. Their dimensions are 2,400 mm × 1,400 mm × 24 mm and their composition is the following:

| Ni | Mo | Cr | Si | C | Mn | W | Co | Fe |
|---|---|---|---|---|---|---|---|---|
| 57% | 16% | 15% | 0.05% | 0.02% | 1% | 4% | 2% | 4%. |

The two base material plates and the two sheet bars, are connected to form a cladding pile, wherein between the sheet bars a layer 3 is inserted. This layer prevents the two sheet bars from being welded together. The pile is prepared as follows: the base material plates 1 and 1' are scarfed and in the edge zone, i.e. within an edge width a, they are ground beveled so that the angle of the beveled plane 4 and 4' in relation to the horizontal 15 amounts to up to 30°. Then onto the beveled planes 4 and 4' welding layers 5, 6, 7 and 8 are laid down. Thus the material that has been ground off is replaced by building-up welding layers. The built-up welding is preferably carried out electrically. These built-up welding layers, or claddings, are built up in the form of short, staggered weld beads which are cooled with water. All the layers 5 to 8 may be produced with an additional welding material consisting of carbon steel. It is preferable, however, to use high-alloy, austenitic electrodes for the first layer 5. After producing the built-up welding layers the cladding pile is composed by laying the narrower and shorter cladding sheet bar 2' the narrower and shorter cladding sheet bar 2' is laid, so that the edges of plate 1' and sheet bar 2' are parallel. Subsequently, the separating layer is put on, the second sheet bar 2 is put on top of the separating layer sandwich-like, and the base material plate 1, which has been prepared in the same way, is laid on top of bar 2. After this has been done weld strips 9 are inserted into the gap formed along the circumference of the cladding pile by the overhanding edges of the base material plates. The weld strips are connected with the claddings by means of root seams 10 and 10'.

Finally further welding layers 11 are laid into the remaining space at the side of the edges and thus the pile is closed flush. At one place along the gap a device according to Austrian Pat. No. 245,895 is inserted and the pile is evacuated and sealed. Subsequently the pile is heated up to 1150°C for four hours and is rolled down to a thickness of 31 mm in 16 passes. Immediately after rolling the pile is subjected to a solution heat treatment at 1,220°C for two hours. Immediately after the heat treatment the pile is quenched in water. The pile is cut open, the sandwiched layers are separated and set, and their surfaces are subjected to an after-treatment by welding. The plates obtained have a thickness of 12 mm at a tolerance of ±0.3 mm. The cladding layer has a thickness of 3 mm. The mechanical properties of the composite plate are given in the following table:

| | Cladding material | Base material |
|---|---|---|
| Tensile strength (kp/mm$^2$) | 70 to 90 | 85 to 90 |
| Yield point (kp/mm$^2$) | 25 to 30 | 25 to 30 |
| Elongation in % ($d_5$) | 45 to 50 | 50 to 60 |

What I claim is:

1. In a method of producing a corrosion-resistant structural shape that is clad by rolling and welding, and which comprises a base material of austenitic manganese steel and a cladding material containing alloy elements tending to phase precipitations, said structural shape being formed from a cladding pile of a certain circumference with a sandwich-like construction composed of two outer base material plates and two inner cladding sheet bars having smaller dimensions than the base material plates so that the base material plates overhang the cladding sheet bars, a separating layer being inserted between the cladding sheet bars for preventing said cladding sheet bars from being welded together, a gap formed by the overhang of the base material plates surrounding the cladding sheet bars and being closed all around by weld strips welded together with the base material plates, the improvement comprising:
   grinding a bevel into the base material plates at their edges, said bevel extending over substantially all of the overhang of the base material plates,
   replacing ground-off material by building-up a plurality of welding layers of carbon steel,
   composing the pile and inserting the weld strips,
   connecting the weld strips, by means of root seams along the circumference of the pile, with the built-up welding layers, and
   tightly closing the gap by applying further welding layers between the built-up welding layers and the weld strips, whereby the pile is completed.

2. A method as set forth in claim 1, wherein the ground bevel at the edges of the base material plates is at an angle of from 15° to 30°.

3. A method as set forth in claim 1, wherein cooling with water is effected while building-up the welding layers.

4. A method as set forth in claim 1, wherein for the first built-up welding layer, high-alloy austenitic electrodes are used.

5. A method as set forth in claim 1, wherein for the built-up welding layers following the first built-up welding layer, carbon steel is used as an additional material.

* * * * *

UNITED STATES PATENT AND TRADEMARK OFFICE
CERTIFICATE OF CORRECTION

PATENT NO. : 3,981,426
DATED : September 21, 1976
INVENTOR(S) : Giswalt Veitl

It is certified that error appears in the above–identified patent and that said Letters Patent are hereby corrected as shown below:

Column 1, line 15, "used;" should read --used,--;

Column 1, line 39, delete "between";

Column 1, line 61, "whole" should read --whose--;

Column 2, line 50, delete "the";

Column 3, lines 59-60, "the narrower and shorter cladding sheet bar 2' is laid" should read --onto the upper, ground surface of the base material plate 1'--.

Signed and Sealed this

Eighth Day of February 1977

[SEAL]

Attest:

RUTH C. MASON
*Attesting Officer*

C. MARSHALL DANN
*Commissioner of Patents and Trademarks*